United States Patent [19]

Yamanoi et al.

[11] Patent Number: 4,932,603
[45] Date of Patent: Jun. 12, 1990

[54] SAFETY BELT ARRANGEMENT WITH PRETENSIONING MECHANISM

[75] Inventors: Toshimi Yamanoi, Kanagawa; Shoichi Nojima, Shizuoka, both of Japan

[73] Assignees: Nissan Motor Company, Limited, Yokohama; Fuji-Autolib Company, Limited, Kosai, both of Japan

[21] Appl. No.: 288,126

[22] Filed: Dec. 22, 1988

[30] Foreign Application Priority Data

Dec. 23, 1987 [JP] Japan ................................. 62-326049
Apr. 30, 1988 [JP] Japan .............................. 63-58745[U]

[51] Int. Cl.⁵ ............................................ B60R 22/46
[52] U.S. Cl. ................................................... 242/107
[58] Field of Search ......... 242/107, 107.4 R, 107.4 A, 242/107.4 B; 280/806; 297/478, 480

[56] References Cited

U.S. PATENT DOCUMENTS 4,423,846 1/1984 Föhl ..................................... 242/107
4,549,704 10/1985 Föhl ..................................... 242/107
4,558,832 12/1985 Nilsson ................................ 242/107
4,618,108 10/1986 Butenop ............................. 242/107
4,750,686 6/1988 Fohl ..................................... 242/107
4,750,759 6/1988 Escaravage ..................... 242/107 X

FOREIGN PATENT DOCUMENTS 3400177 7/1985 Fed. Rep. of Germany .
2491340 4/1982 France .
2180734 4/1987 United Kingdom .

Primary Examiner—John M. Jillions
Attorney, Agent, or Firm—Foley & Lardner, Schwartz, Jeffery, Schwaab, Mack, Blumenthal & Evans

[57] ABSTRACT

A safety belt arrangement employs a pretensioning mechanism or device which has a pulley assembly which includes a plurality of pulley segments separated from each other. The segments are normally placed apart from a gear corotatable with a spool shaft. On the other hand, the segments are driven in response to collision shock toward the gear of the spool shaft for transmitting a retracting force generated by a gas generator to a belt spool for pretensioning the belt.

14 Claims, 11 Drawing Sheets

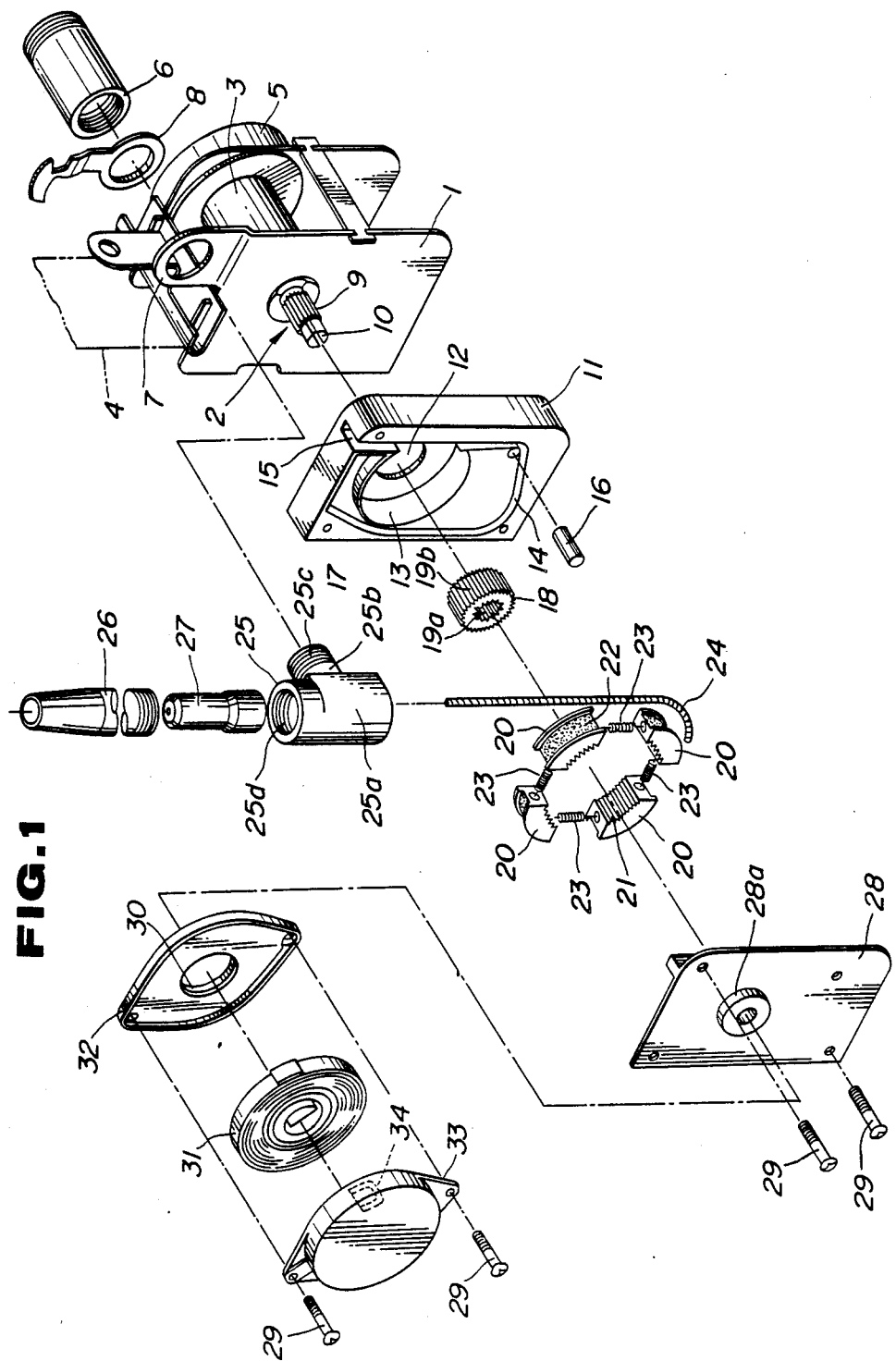

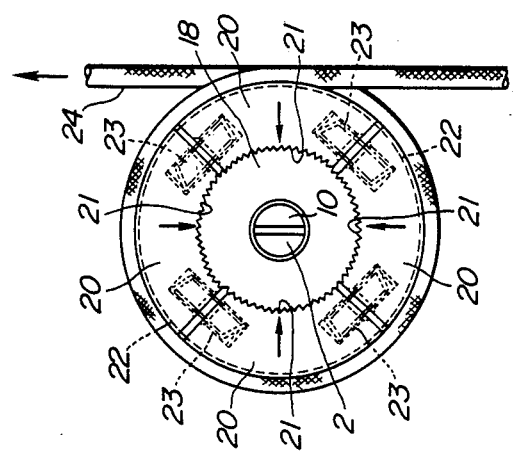
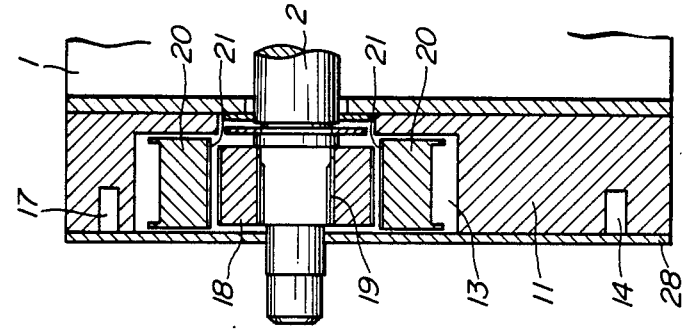
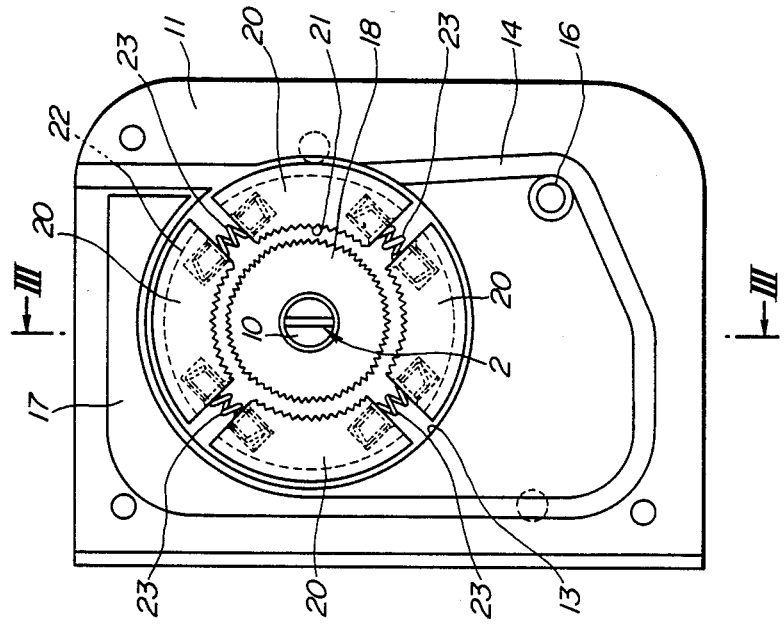

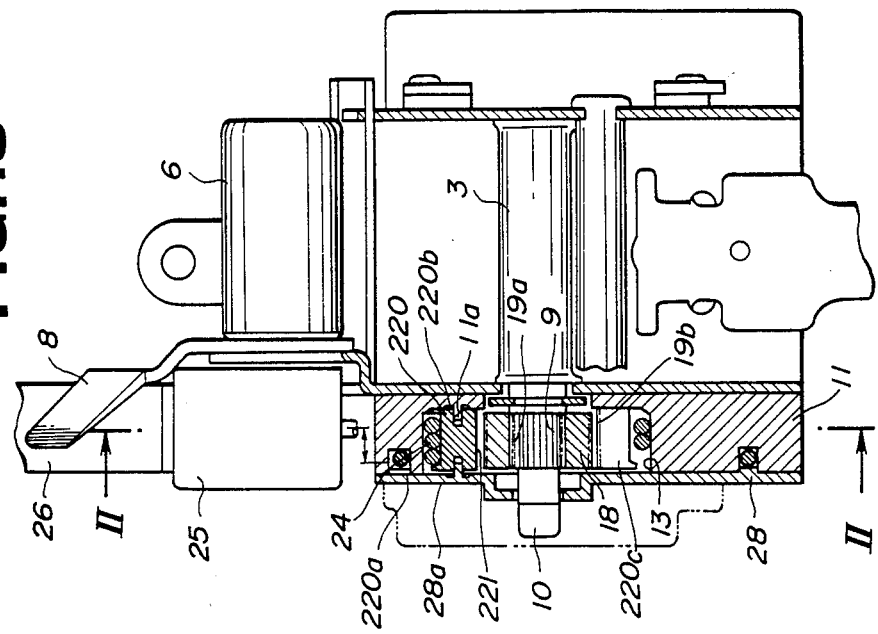
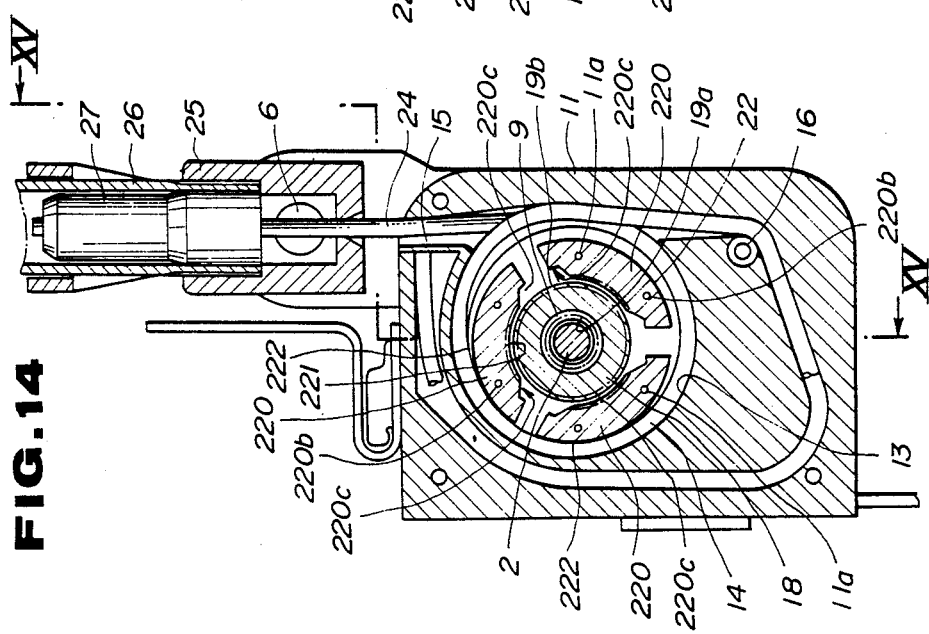

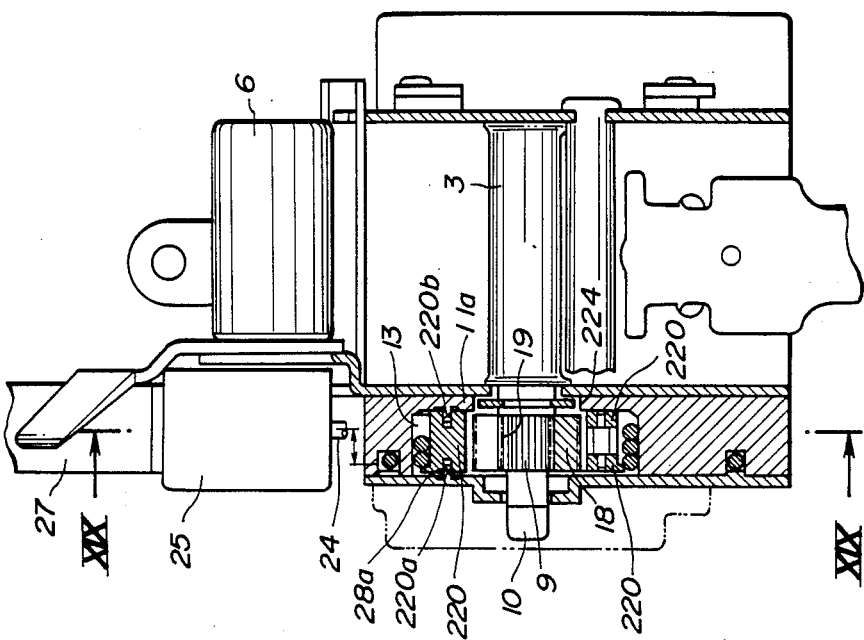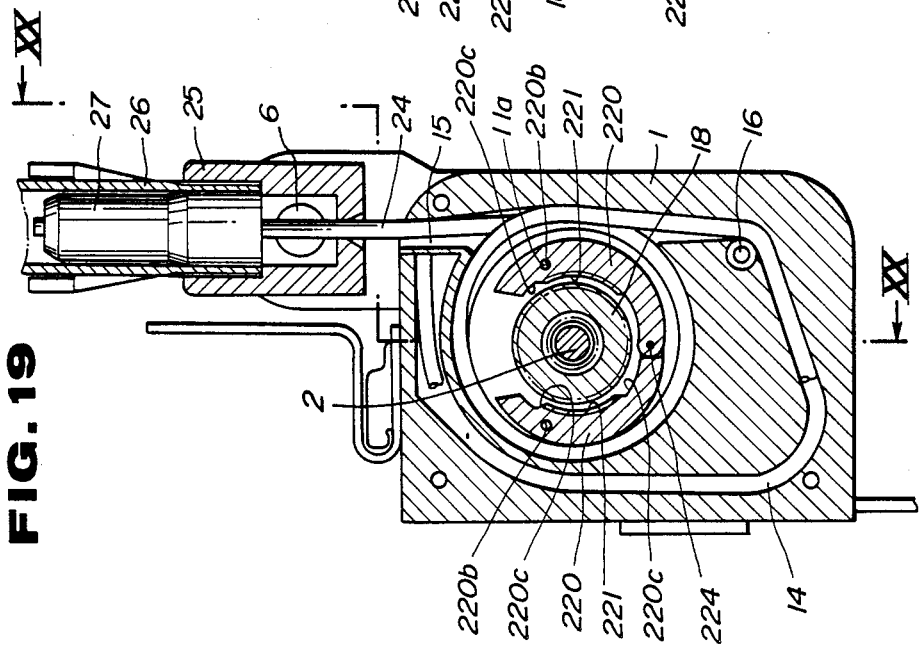

SAFETY BELT ARRANGEMENT WITH PRETENSIONING MECHANISM

BACKGROUND OF THE INVENTION

1. Field of the Invention

The present invention relates generally to a safety belt arrangement for a vehicle, such as an automotive vehicle. More specifically, the invention relates to a safety belt arrangement with a so-called pretensioner or preloader mechanism which is sensible of excessive deceleration energy or collision shock for instantly retracting extra length of belt.

2. Description of the Background Art

In general, safety belt arrangements are mounted on vehicles for safety of passengers on the vehicle upon occurrence of collision. Generally, such safety belt arrangements operate to retain passengers on their seat so as to prevent them from colliding onto installations in the vehicle cabin.

Conventionally known safety belt arrangements include belt spools in belt retractors, these belt spools are normally biased toward the retracting direction, and have a locking mechanism for locking the belt spool for preventing the latter from rotating in extracting directions in response to excessive vehicular deceleration and/or excessive belt extraction speed. However, such an emergency lock retractor type safety belt system cannot completely avoid the so-called film spool effect of permitting a short length of belt from the belt spool even after establishing locking.

To improve this, safety belt arrangements were proposed with a so-called pretensioner mechanism which is responsive to excessive deceleration energy upon collision and so forth, and takes action of the driving belt spool in the retracting direction for tightening the belts to ensure prevention of the passengers' movements. This prior proposed pretensioner mechanism comprises a cylinder with a piston disposed therein. The piston is connected to one end of a friction wire element which has the other end associated to a pulley secured on a axle of a belt spool. In case of emergency, the piston is driven by pressure generated by a gas generator for instantly driving the belt spool in the retracting direction via the pulley. Engagement between the pulley and the spool axle is established by means of gear engagement between an internal gear formed on the inner periphery of the pulley and a pinion gear rigidly secured on the spool axle, or by means of a kind of clutch mechanism which comprises a clutch member with an internal gear and a pinion gear secured on the spool axle.

In the case where the gear arrangement is employed, the pulley and the friction wire are normally placed away from each other and come into frictional engagement when the piston is driven. This construction causes lag time for driving the belt spool in the retracting direction. On the other hand, in the case where the clutch mechanism is employed, construction becomes complicated. Furthermore, by the instant load applied to the clutch mechanism, tendency of breakage is feared.

SUMMARY OF THE INVENTION

Therefore, it is an object of the present invention to provide a safety belt arrangement with a pretensioner mechanism which can resolve the problem encountered in the conventional mechanism set forth above.

In order to accomplish aforementioned and other objects, a safety belt arrangement, according to the present invention, employs a pretensioning mechanism or device which has a pulley assembly which includes a plurality of pulley segments separated from each other. The segments are normally placed apart from a gear corotatable with a spool shaft. On the other hand, the segments are driven in response to collision shock toward the gear of the spool shaft for transmitting retracting force generated by a gas generator to a belt spool for pretensioning the belt.

According to one aspect of the invention, a safety belt arrangement for a vehicle includes: a safety belt to be worn by a passenger, a belt spool, on which inner end of the safety belt is engaged and on which extra length of the safety belt is wound therearound, where the belt spool is rotatable in a extracting direction and a retracting direction, a rotary shaft rigidly connected to the belt spool for rotation therewith, the rotary shaft having a gear member provided for corotation therewith, Also, a pretensioning mechanism including a drive pulley assembly composed of a plurality of mutually separated segments, each of which has gear teeth opposing the gear teeth of the gear member, and a pulley drive means which is responsive to a collision shock to exert rotational force for driving the pulley in the retracting direction.

Furthermore, the invention includes means, associated with the segments, for normally maintaining the segments in an initial position to place the gear teeth thereof away from the gear teeth of the gear member, the means for maintaining the segments at the initial position being responsive to the rotational force exerted by the pulley drive means upon occurrence of the collision shock to allow the segments to move toward the gear member for establishing engagement between the gear teeth for allowing transmission of rotational force to the belt spool for driving the latter in the retracting direction for retracting the extracted and/or loosened belt onto the belt spool.

In the preferred embodiment, the pulley drive means includes a pressure generator, a thrusting piston responsive to the pressure to be driven in a direction corresponding to the retracting direction, and an elongated member for transmitting the driving force to the pulley. The pulley drive means may include a gas generator for creating the pressure in response to occurrence of collision.

The means for maintaining the segments at the initial position, may comprise springs disposed between adjacent segments to exert spring force to place the segments in a position placing the gear teeth of the segments away from the gear teeth of the gear member. In such case, the segments may be formed in an arc shaped configuration to form a complete annular pulley as assembled.

Preferably, the elongated member is so designed to release force for inwardly shifting the segments for establishing engagement between the gear teeth of the segments and the gear member after completion of the pretensioning operation and to allow the segments to return to the initial position.

Alternatively, the segments may be pivotally connected to each other at one end and the means including a spring normally biasing the free ends of the segments in a direction away from each other so as to maintain the gear teeth of the segments from the gear teeth of the gear member. The pulley drive means includes a pressure generator, a thrusting piston responsive to the pressure to be driven in a direction corresponding to the retracting direction, and an elongated member for transmitting the driving force to the pulley. The pulley drive means includes a gas generator for creating the pressure in response to a collision. The elongated member is so designed to release force for inwardly shifting the segments for establishing engagement between the gear teeth of the segments and the gear member after completion of the pretensioning operation and to allow the segments to return to the initial position.

In the further alternative, the means for maintaining the segments at the initial position includes supporting pins which are provided a critical force smaller than the radial component of the rotational force to be exerted on the segments thereby causing breakage for allowing radially inward movement of the segments to establishing engagement of the gear teeth thereof to the gear teeth of the gear member. On the other hand, the segments may be pivotally connected to each other at one end and the means for maintaining the segments at the initial position may also include supporting pins supporting the other ends of the segments in a position spaced apart from the gear member in order to maintain the segments at the initial position, which support pins are a critical force smaller than the radial component of the rotational force to be exerted on the segments thereby causing breakage for allowing radially inward movement of the segments to establish engagement of the gear teeth thereof to the gear teeth of the gear member.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIG. 1 is an exploded perspective view of the first embodiment of a pretensioner-type safety belt arrangement according to the present invention;

FIG. 2 is a front elevation of the major part of the first embodiment of the safety belt arrangement of FIG. 1;

FIG. 3 is a section taken along line III—III of FIG. 2;

FIG. 4 is a front elevation of a clutch mechanism employed in the first embodiment of the safety belt arrangement of FIG. 1;

FIG. 14 is a front elevation of the major part of the third embodiment of the safety belt arrangement of FIG. 13;

FIG. 15 is a section taken along line XV—XV of FIG. 14;

FIG. 19 is a front elevation of the major part of the safety belt arrangement of FIG. 18;

FIG. 20 is a section taken along line XX—XX of FIG. 18; and

DESCRIPTION OF THE PREFERRED EMBODIMENT

Figure 5:
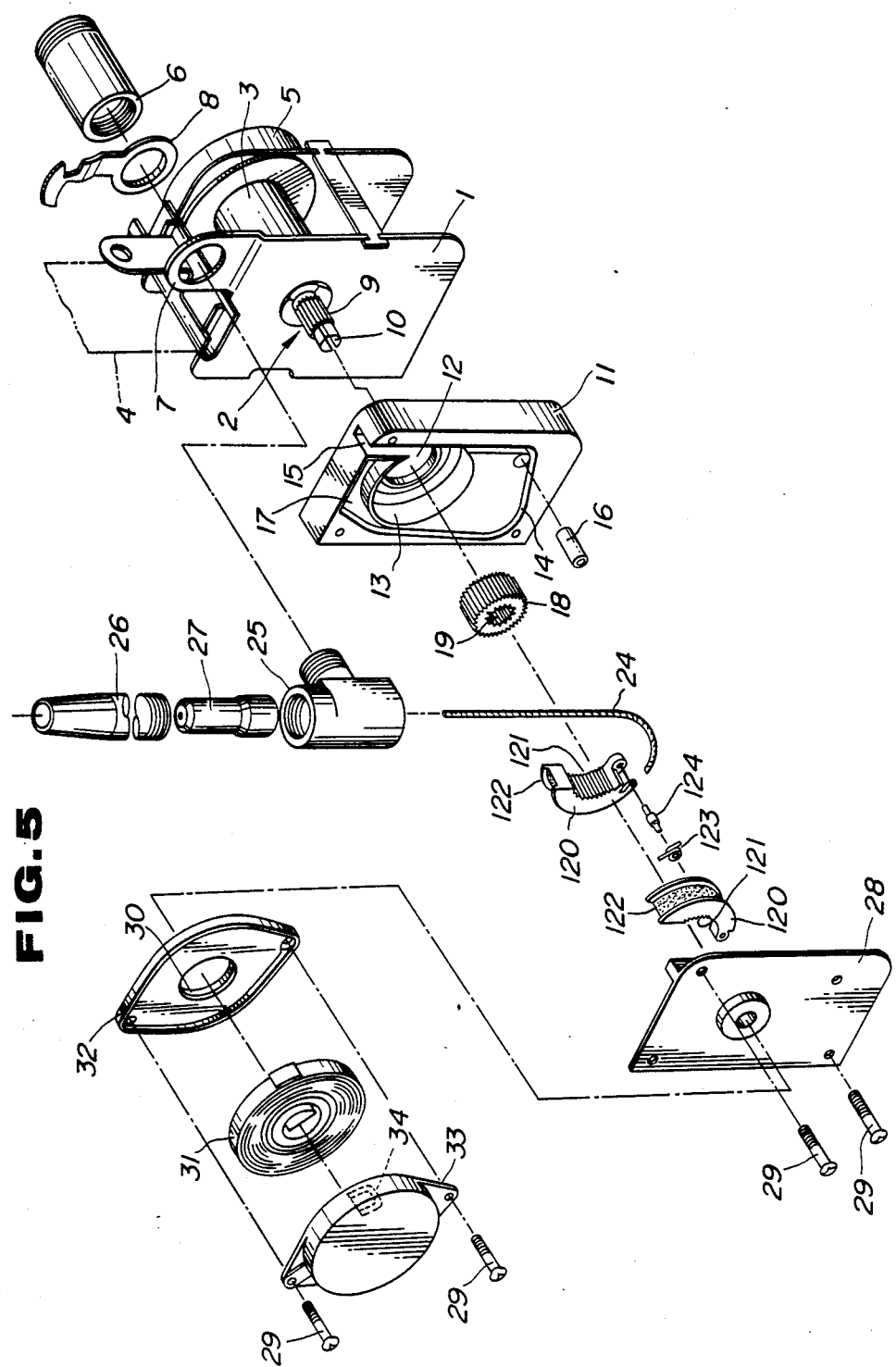
FIG. 5 is an exploded perspective view of the second embodiment of a pretensioner-type safety belt arrangement according to the present invention.

Referring now to the drawings, particularly to FIG. 1, the first embodiment of a safety belt arrangement, according to the present invention, has a housing 1 formed of a metal plate. A belt spool 3 on which a safety belt 4 is wound with fixing one end thereonto, is disposed in the housing 3 and secured to a spool shaft 2 which is rotatably supported on the housing. A belt locking assembly is housed in a locking assembly cover 5 which is secured on one side of the housing 1. The locking assembly includes a known deceleration or inertia responsive locking mechanism which includes a ratchet wheel, a locking pawl, and an inertia mass.

A pretensioning mechanism is provided on the other side of the housing 1. The pretensioning mechanism includes a gas generator 6 supported by means of a support 8 which is secured onto a holder section 7 formed on the associated side wall of the housing 1. The pretensioning mechanism further comprises a pinion gear 9 rigidly secured on or integrally formed with the spool shaft 2 at a portion extending from the housing 1 toward the side where the pretensioning mechanism is provided. As seen from FIG. 1, a slit 10 is formed in the end of the spool shaft 2 extending from the housing 1.

A casing 11 of the pretensioning mechanism is firmly but removably installed on the housing 1. The casing 11 is formed with a through opening 12 through which the spool shaft 2 extends. The casing 11 further defines a recess 13 around the through opening 12. The recess 13 is formed on the stepped down section 14 formed on the casing 11. A groove 15 is also formed with the casing 11, which groove is connected to the circular recess 13 and the stepped down section 14. A pipe spring 16 is inserted into the opening formed through the casing.

The open end of the casing 11 is closed by means of a lid member 28 which is fixed to the casing by means of fastening screws or bolts 29. A pretensioning mechanism receptacle 17 is thus defined in the casing 11.

The pretensioning mechanism includes a gear 18 which has an internal gear teeth 19a engaged with the pinion gear 9 of the spool shaft 2 within the recess 13. The gear 18 also has an external gear teeth 19b. Opposing to the external gear teeth 19b, a plurality of a pulley segments 20 are provided in the radial outside orientation. In the shown embodiment, four pulley segments 20 are employed for formulating the pulley of the pretensioning mechanism. The pulley segments 20 are of equal arc length to each other and form a complete circle as assembled. Each of the pulley segments 20 is formed with an internal gear tooth 21 and an external and circumferentially extending groove 22. Between respectively adjacent pulley segments 20, compression coil springs 23 are provided. The coil springs 23 are designed for constantly exerting biasing force to the associated pulley segments 20 in a direction to be mutually separated away from each other. With this spring force, the pulley segments 20 are normally spaced apart from each other so as to have the diameter of the circle greater than the circle completed by assembling four segments. The maximum diameter of the circle formed by the pulley segments 20 when they are placed apart from each other, is determined by the internal diameter of the recess 13.

The bottom of the groove 22 of the pulley segments 20 has a frictional surface so as to provide a sufficiently high friction coefficient. An actuation wire 24 is wound on the pulley segments 20 by several turns. One end of the wire 24 extends through the groove 15 so as to extend upwardly therethrough. The end of the wire 24 further extends through an essentially T-shaped cylindrical joint member 25. The joint member 25 has a vertically extending section 25a through which the wire 24 extends, and a laterally extending section 25b which has a threaded end 25c to engage with the internal thread 6a of the gas generator 6. The vertically extending section 25a also has an internally threaded end 25d engageable with the threaded lower end 26a of an actuator cylinder 26. An actuator piston 27 is disposed within the interior space defined in the actuator cylinder 26 for thrusting movement therethrough. The end of the wire 24 is connected to the actuator piston 27.

The gas generator 6, the joint member 25 and the actuator cylinder 26 as assembled form an actuator with a gas tight actuator chamber beneath the piston.

The other end of the wire 24 extends through the stepped down section via the pipe spring 16 and the extra length of wire is stored in the chamber 17. The length of the wire 24 stored in the chamber 17 has to be longer than the possible maximum stoke of the actuator piston 27. Therefore, the piston 27 can thrustingly stroke to its maximum stroke. As seen from FIG. 1, the upper end of the actuator cylinder 26 is tapered and opened upwardly so as to establish air communication therethrough. This prevents the air within the upper side of the actuator piston 27 from serving as resistance against movement of the piston. A retractor spring assembly including a retractor coil spring 31 and covers 32 and 33 are provided outside of the pretensioning mechanism casing 11 and secured onto the lid member 28. The cover 32 is formed with a center opening 30 engaging with a cylindrical extension 28a of the lid member 28. On the other hand, the cover 33 has hook 34 to which the outer end of the coil spring 31 is rigidly engaged. On the other hand, the inner end of the coil spring 31 engages with the slit 10 formed on the end of the spool shaft 2 so as to exert retracting force to the belt spool 3 through the spool shaft 2. As seen from FIG. 1, the covers 32 and 33 are secured on the lid member 28 by means of the fastening screw or bolt 29.

In the normal condition, the pulley segments 20 are oriented spaced apart from respectively adjacent segments by the spring force of the compression springs 23, as seen from FIGS. 2 and 3.

The gas generator 6 contains an explosive as a pressure medium and ignitor therefor. The ignitor of the gas generator 6 is connected to a sensor (not shown) provided at the front end of a vehicular body, which sensor detects shock exerted on the vehicular body when collision occurs. The explosive explodes by actuation of the ignitor in response to the sensor detecting the collision shock. Explosion of the explosive in the gas generator 6 generates a high pressure gas. The high pressure gas flows from the gas generator 6 into the actuator chamber via the joint member 25. With the high pressure gas introduced into the actuator chamber, the actuator piston 27 is driven upwardly while also pulling the associated end of the wire 24 upwardly.

When the wire 24 is pulled, the pipe spring 16 serves to provide resistance for the wire movement. By this, the initial stroke of the piston and wire serves for providing tightening torque for contracting the diameter of the circle against the compression spring 23, as shown in FIG. 4. Reduction of the diameter of the circle establishes engagement between the inner gear teeth 21 and the external gear teeth 19b. After completing a circle of the pulley segments 20, the pulley as the assembly of the pulley segments 20 is driven in the retracting direction. This provides retracting torque for the belt 4 via the gear 18 engaging with the pinion 9 of the spool shaft 2 via the internal gear teeth 19a. This causes instant rotation of the belt spool 3 to tighten the belt wound around the belt spool.

After the loosened belt on the belt spool 3 is tightly rewound, the lock assembly in the lock assembly cover 5 establishes locking for preventing belt spool 3 from rotating in the extracting direction. Therefore, the passenger on the seat is firmly retained in the associated vehicular seat before starting movement due to inertia energy. This assures safety of the passenger upon the occurrence of a collision.

In the shown embodiment, the end of the wire 24 stored in chamber 17 is made free, the torque which serves for reducing the diameter of the circle of the pulley segments 20 and whereby establishes engagement of the internal gear teeth 21 and the external gear teeth 19b of the gear 18, disappears. Therefore, the pulley assembly is released from engagement with the gear 18 once retraction of the belt is performed. This enables belt spool 3 to be rotated in the extracting direction after the collision shock disappears. Therefore, the passenger can be released from restriction of the belt and thus can escape from the vehicle.

FIGS. 5 to 8 illustrate the second embodiment of the safety belt arrangement, according to the present invention. As will be appreciated from FIG. 5, the construction of the pulley assembly is the only difference between the shown embodiment and the former first embodiment.

Figure 7:
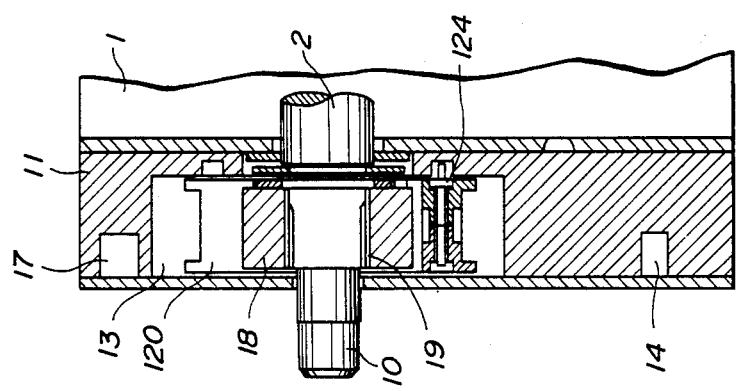
FIG. 7 is a section taken along line VII—VII of FIG. 6.
Figure 6:
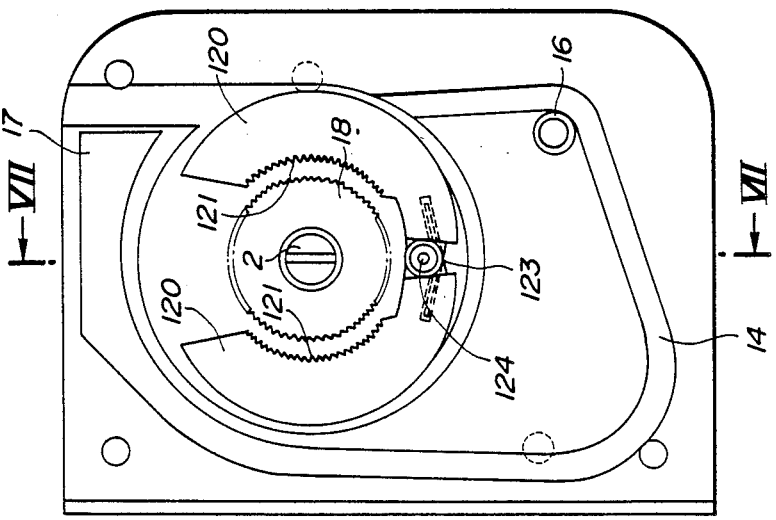
FIG. 6 is a front elevation of the major part of the second embodiment of the safety belt arrangement of FIG. 5.

In the shown embodiment, the pulley assembly includes a pair of semicircular pulley segments 120. The pulley segments 120 are formed with the internal gear teeth 121. The pulley segments 120 are also formed with circumferentially extending pulley grooves 122 for receiving therein the actuation wire 24. The pulley segments 120 are pivotally connected for allowing pivotal movement via a pivot pin 122. A coil spring 123 is disposed in the pivoted portion for constantly biasing the pulley segments 120 to place the other ends away from each other, as shown in FIGS. 6 and 7.

Figure 8:
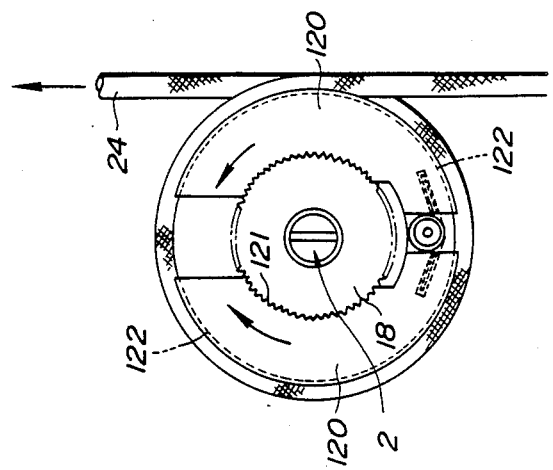
FIG. 8 is a front elevation of a clutch mechanism employed in the second embodiment of the safety belt arrangement of FIG. 5.

Similar to the former embodiment, the actuator piston 27 is driven by the gas pressure generated by explosion of the explosive to drive the wire 24. By the piston stroke, the wire exerts the torque to cause pivotal movement of the pulley segments 120 to establish engagement between the internal gear 121 and the external gear 19b of the gear 18, as shown in FIG. 8. Therefore, pretensioning operation can be successfully performed.

On the other hand, after the force exerted on the pulley segments 120 via the wire 24 appears, the pulley segments are pivotally moved by the spring force of the coil spring 123 in a direction away from each other. As a result, the internal gear teeth 121 is released from the external gear teeth 19b of the gear 18. Therefore, the belt spool 3 becomes free from restriction and can be rotated in the extracting direction for releasing the passenger from belt.

Figure 9:
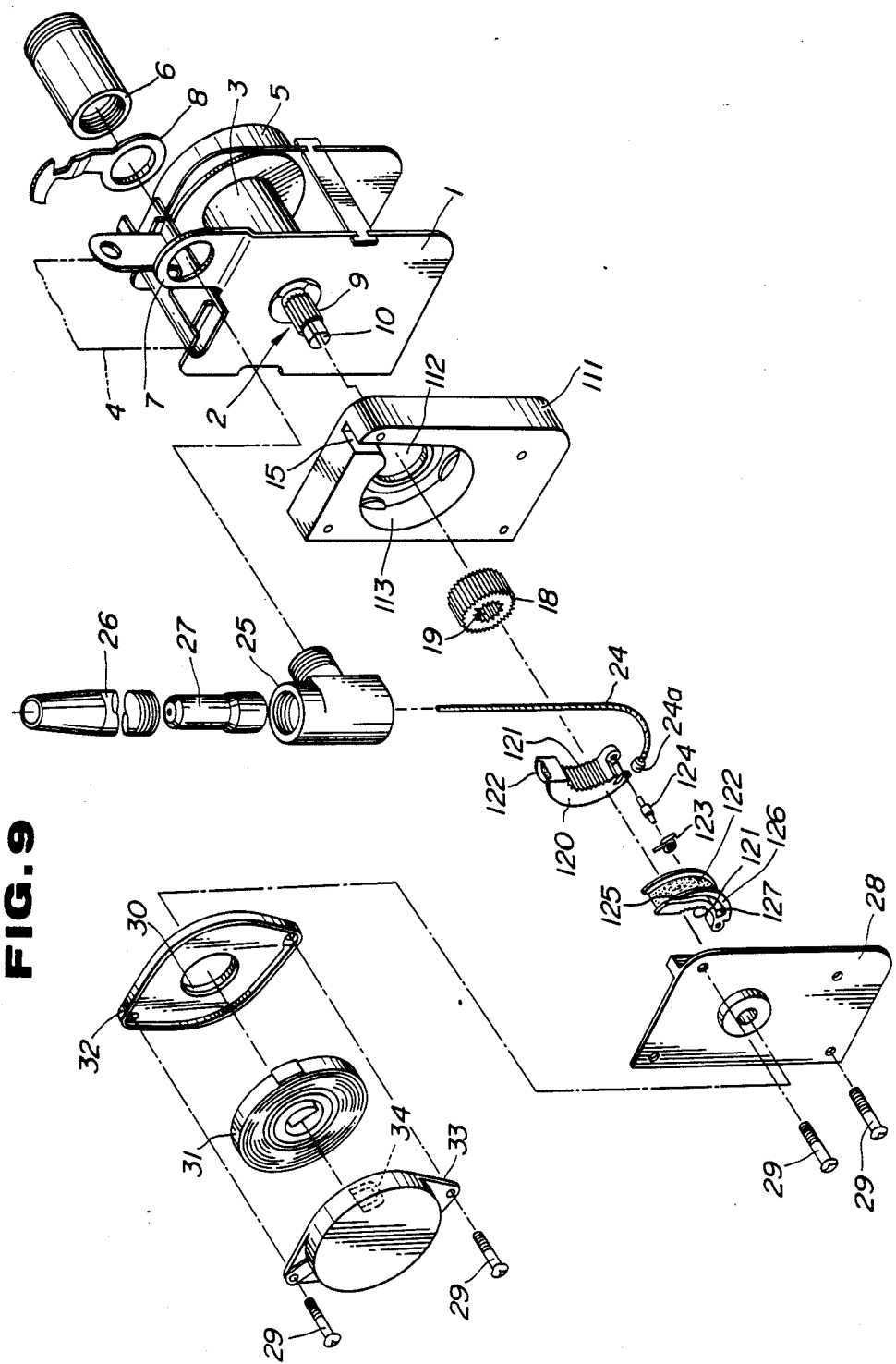
FIG. 9 is an exploded perspective view of a modification of the second embodiment of a pretensioner-type safety belt arrangement according to the present invention.
Figure 12:
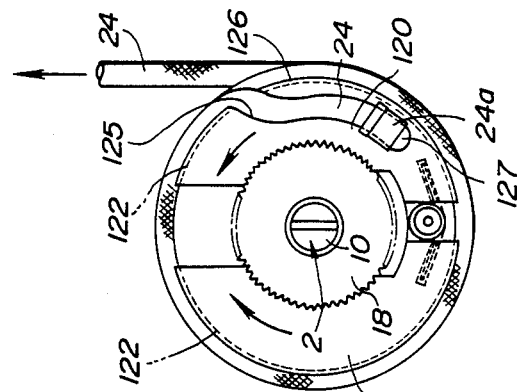
FIG. 12 is a front elevation of a clutch mechanism employed in the second embodiment of the safety belt arrangement of FIG. 9.

FIGS. 9 and 12 show a modification of the second embodiment of the aforementioned second embodiment of the safety belt arrangement of the present invention.

Figure 11:
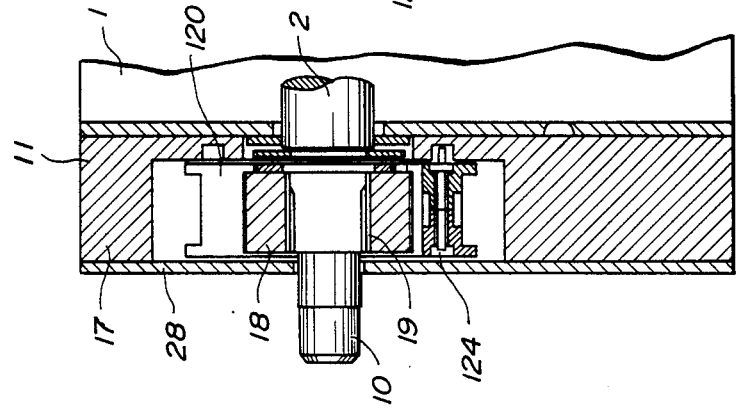
FIG. 11 is a section taken along line XI—XI of FIG. 10.
Figure 10:
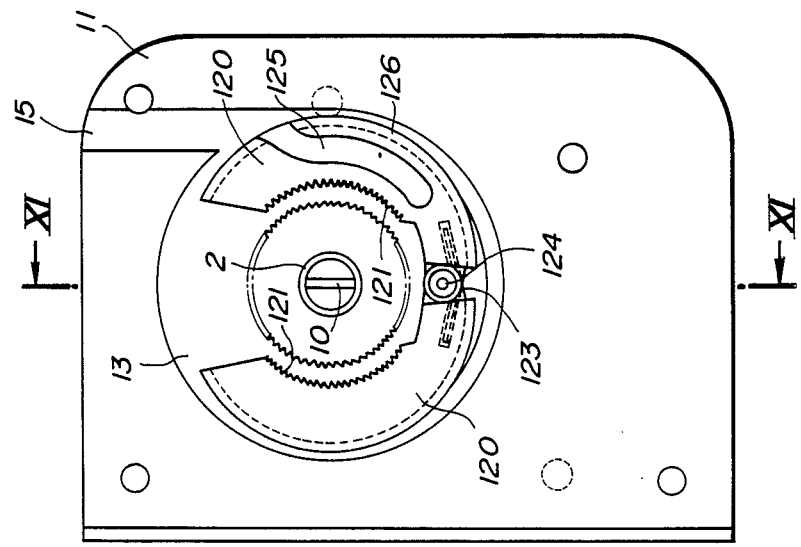
FIG. 10 is a front elevation of the major part of the safety belt arrangement of FIG. 9.
Figure 13:
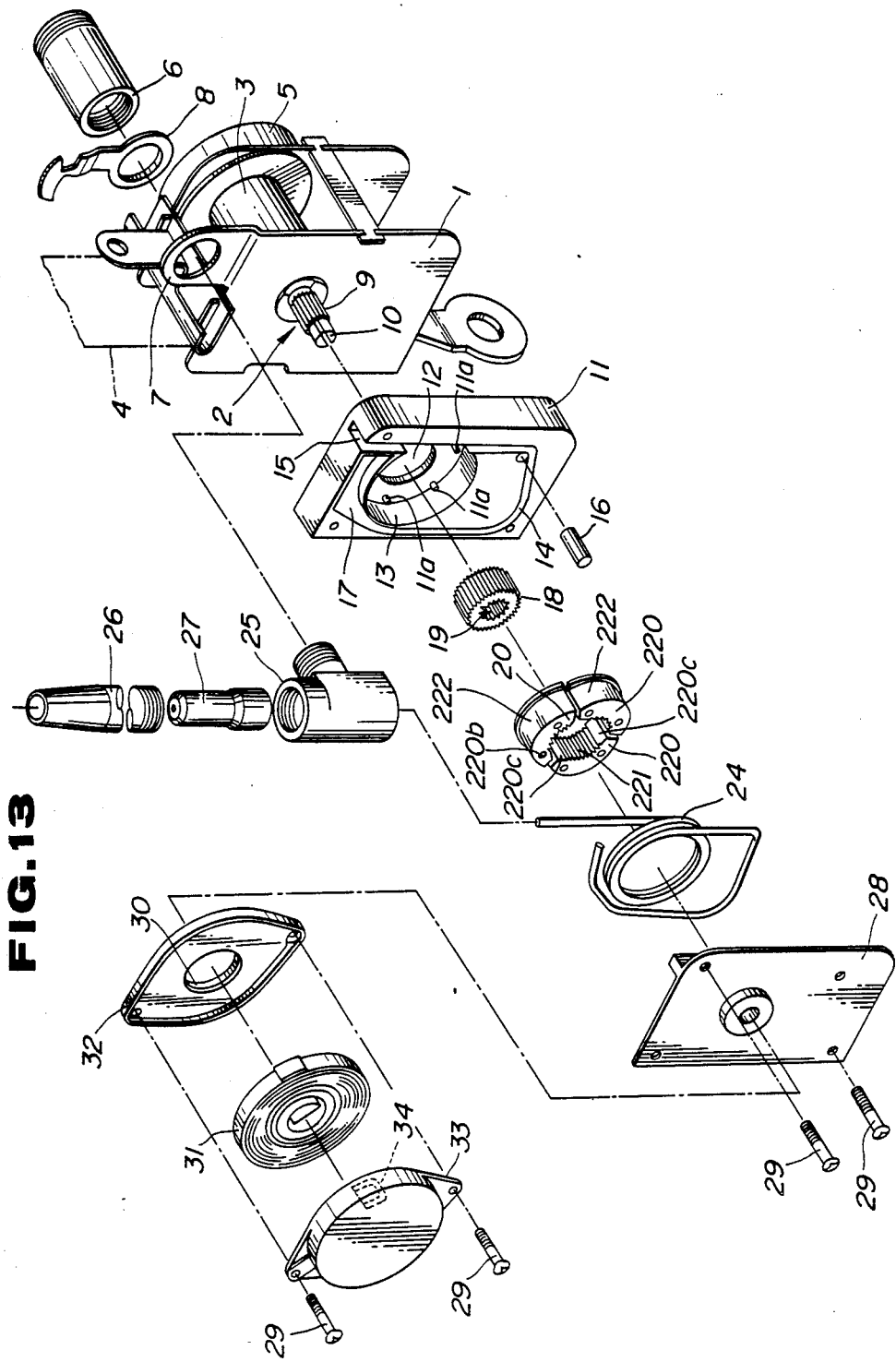
FIG. 13 is an exploded perspective view of the third embodiment of a pretensioner-type safety belt arrangement according to the present invention.

In this embodiment, the pretensioning mechanism casing 111 is modified to define a circular recess 113 serving as a pulley receptacle. The recess 113 is connected with an opening 112 through which the spool shaft 2 is inserted. In the shown embodiment, one of the pulley segments 120 has a flange 126 formed with a groove 125 with a bottom 127. The width of the groove 125 is so determined as to receive the end of the wire 24. The wire 24 has an end plug 24a having greater diameter than the width of the groove 125. With this construction, the end of the wire 24 is loosely engaged to the groove 125. At the normal condition, the pulley segments 120 are placed in a position shown in FIGS. 10 and 11. As seen herefrom, the pulley segments 120 are oriented at expanded position to place the internal gear teeth 121 away from the external gear teeth 19b of the gear 18. The pulley segments 120 are driven to approach the free ends toward each other when the gas generator 6 becomes active to drive the actuator piston 27. This performs the pretensioning operation.

After establishing the pretension force to retract the belt for tight winding onto belt spool 3 and thus causing the passenger to be tightly fastened, the pulley segments 120 become free from the force pivoting them toward each other, the pulley segments are pivotally driven to the initial position by the spring force of coil spring 123 to disengage the internal gear teeth 121 from the external gear teeth 19b of gear 18. Therefore, belt spool 3 becomes free from restriction. Therefore, the belt 4 can be extracted from belt spool 3 so as to free the passenger from the belt.

FIGS. 13 to 17 show third embodiment of the safety belt arrangement according to the present invention. In this embodiment, the pulley assembly includes three pulley segments 220. Each pulley segment 220 is formed with an internal gear teeth 221 opposing the external gear teeth 19b of gear 18. Each pulley segment 220 has a circumferential periphery 222 on which the actuation wire 24 is wound for several turns. The pulley segments 220 are further formed with openings 220b which engage support pins 11a extending in the recess 13 from the vertical wall of the casing 11.

Figure 16A:
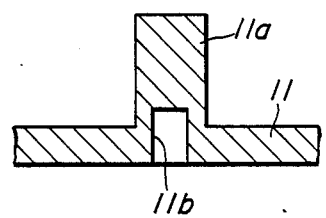
FIGS. 16(a) and 16(b) are enlarged partial section of part of a safety belt retractor casing employed in the third embodiment of the safety belt arrangement of FIG. 13.
Figure 16B:
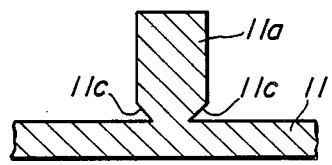

As shown in FIG. 16(a), the support pin 11a has a weak section 11d at the intersection with the vertical wall 11e of casing 11. In this example, the weak section 11d is formed by a groove 11b coaxially formed with pin 11a. With this construction, pin 11a is broken when a radially inward force is exerted to the associated pulley segment 220 by means of the actuation wire 24. An alternative example is shown in FIG. 16(b). In this example, the weak section 11d is formed with a circumferentially extending V-shaped groove 11c. Similarly to the above example of FIG. 16(a), the support pin 11a is broken by the external force exerted on the pulley segment 220 via the wire 24.

It should be appreciated that the shown embodiment further employs the support pins 28a extending from lid member 28. The pins 28a are also in engagement with openings 220a for cooperation with the support pins 11a for supporting the pulley segments 220. The pins 28a maybe formed into the same construction as that of the pins 11a so as to be broken by the external force exerted on the pulley segments 220 via the wire 24.

The pulley segments 220 are further formed with a plane surface section 220c at both circumferential ends. The plane surface sections 220c are tapered outwardly toward the ends placed at a radial orientation from that of the internal gear teeth 121.

Figure 17:
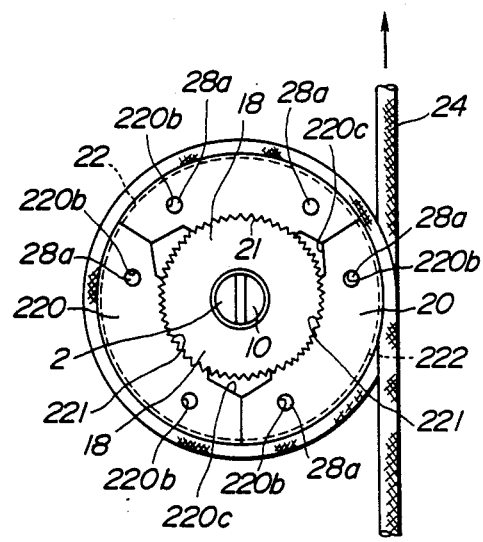
FIG. 17 is a front elevation of a clutch mechanism employed in the third embodiment of the safety belt arrangement of FIG. 13.
Figure 21:
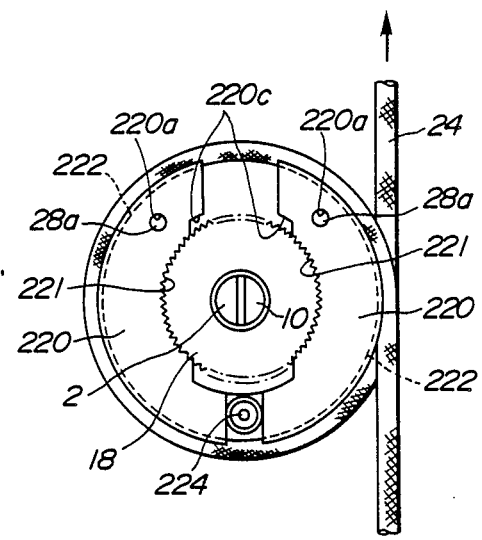
FIG. 21 is a front elevation of a clutch mechanism employed in the safety belt arrangement of FIG. 18.
Figure 18:
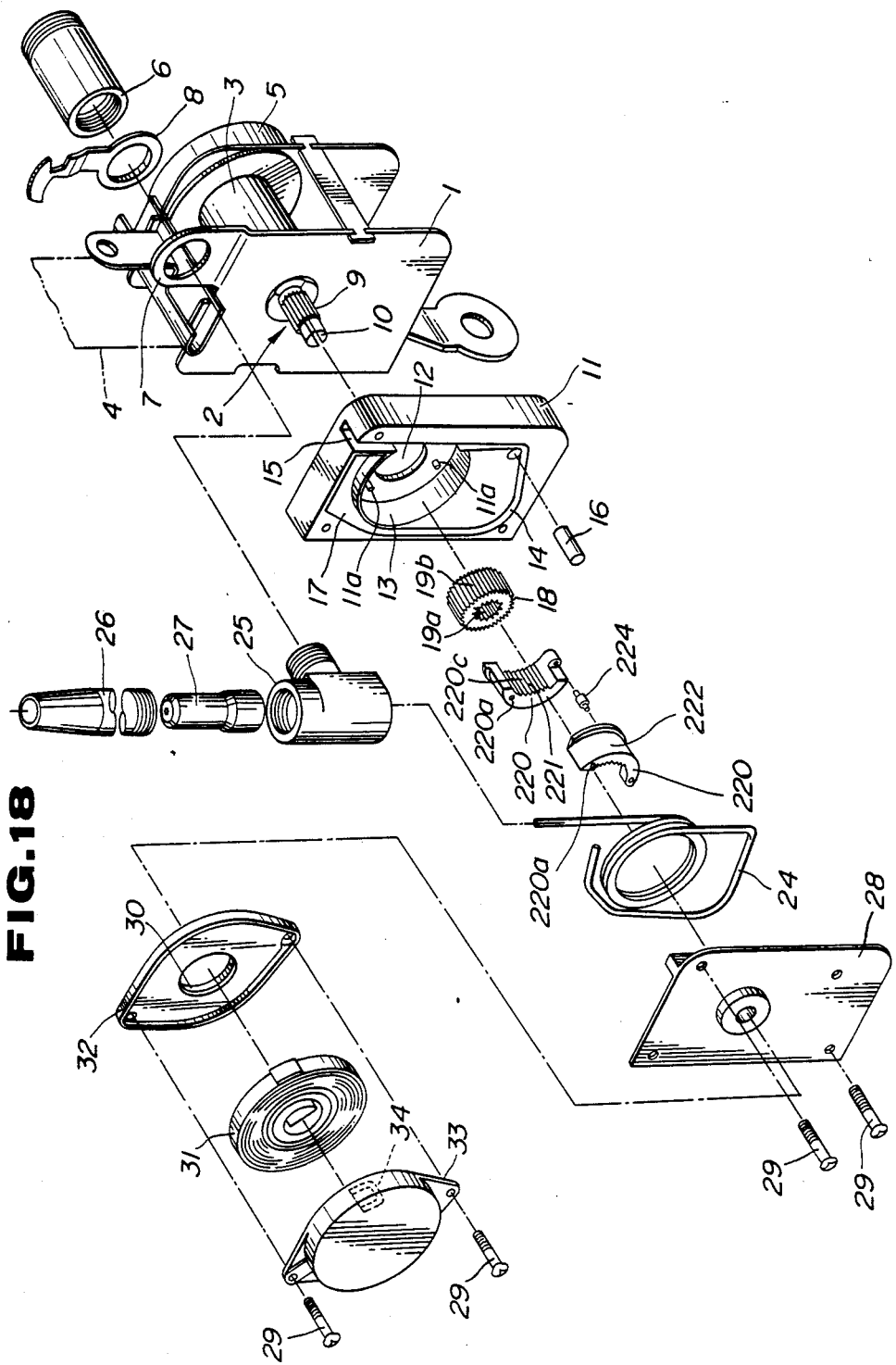
FIG. 18 is an exploded perspective view of a modification of the third embodiment of a pretensioner-type safety belt arrangement according to the present invention.

Pins 11a and 28a are oriented at radial positions to support the pulley segments 220 at a position placing the internal gear teeth 121 away from the external gear teeth 19b in the normal condition, as shown in FIGS. 14 and 15. When collision occurs, the gas generator 6 creates high pressure gas to drive the actuator piston 27 to drive the wire 24 therethrough. By the resistance force of the pipe spring 16, the wire 24 exerts radially inward force to the pulley segments 220. At this time, the force applied by the wire to the pulley segments 220 is greater than the critical force of the pins 11a and 28a which causes breakage thereof. By breaking pins 11a and 28a, the pulley segments 220 becomes free to move in a radially inward direction to establish engagement between the internal gear teeth 221 and the external gear teeth 19b of the gear 18 as shown in FIG. 17. The pulley assembly is then driven to rotate in the retracting direction to tightly wind the belt onto the belt spool 3. Therefore, pretensioning for restricting the passenger on the associated seat can be assured.

FIGS. 18 to 21 shows a modification of the above-mentioned third embodiment of the safety arrangement of FIGS. 13 to 17. In the shown modification, the pulley assembly comprises a pair of semicircular pulley segments 220. The segments 220 are pivotally connected to each other for pivotal movement about a pivot pin 224. Each pulley segment 220 is formed with the internal gear teeth 221. On the other hand, the pulley segments 220 are formed with a pair of aligned recesses 220a and 220b for engaging with support pins 11a and 28a. With pins 11a and 28a, the pulley segments 220 are normally positioned to place the internal gear teeth 221 away from the external gear teeth 19b of the gear 18, as shown in FIGS. 19 and 20.

Similarly to the former embodiment, pins 11a and 28a are formed to be broken by an external force greater than a predetermined force input from the via wire 24. Therefore, when collision occurs, the pulley segments 220 are applied the force for an inward pivotal force to cause breakage of pins 11a and 28a. This establishes engagement between the internal gear teeth 221 and the external gear teeth 19b of the gear 18 so as to provide pretension for the belt as set forth above.

Therefore, as will be appreciated herefrom, the present invention fulfills all of the objects and advantages sought therefor with simplified construction.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A safety belt arrangement for a vehicle, comprising:
   a safety belt to be worn by a passenger;
   a belt spool, on which an inner end of said safety belt is engaged and on which extra length of said safety belt is wound therearound, said belt spool being rotatable in an extracting direction and a retracting direction;
   a rotary shaft rigidly connected to said belt spool for rotation therewith, said rotary shaft having a gear member provided for corotation therewith;
   a pretensioning mechanism including a drive pulley assembly composed of a plurality of mutually separated segments, each of which has gear teeth opposing the gear teeth of said gear member, and a pulley drive means which is responsive to a collision shock to exert rotational force for driving said pulley in said retracting direction; and
   means, associated with said segments, for normally maintaining said segments in an initial position to place said gear teeth thereof away from the gear teeth of said gear member, said means for maintaining said segments at said initial position being responsive to said rotational force exerted by said pulley drive means upon occurrence of said collision shock to allow said segments to move toward said gear member for establishing engagement between said gear teeth for allowing transmission of a rotational force to said belt spool for driving the latter in said retracting direction for retracting the extracted and/or loosened belt onto said belt spool.

2. A safety belt arrangement as set forth in claim 1, wherein said pulley drive means includes a pressure generator, a thrusting piston responsive to said pressure to be driven in a direction corresponding to the retracting direction, and an elongated member for transmitting said driving force to said pulley.

3. A safety belt arrangement as set forth in claim 2, wherein said pulley drive means includes a gas generator for creating said pressure in response to a collision.

4. A safety belt arrangement as set forth in claim 1, wherein said means for maintaining said segments at said initial position, comprises springs disposed between adjacent segments to exert spring force to place said segments in a position placing said gear teeth of said segments away from said gear teeth of said gear member.

5. A safety belt arrangement as set forth in claim 4, wherein said segments are formed in a form of an arc shaped configuration to form a complete annular pulley as assembled.

6. A safety belt arrangement as set forth in claim 5, wherein said pulley drive means includes a pressure generator, a thrusting piston responsive to said pressure to be driven in a direction corresponding to the retracting direction, and an elongated member for transmitting said driving force to said pulley.

7. A safety belt arrangement as set forth in claim 6, wherein said pulley drive means includes a gas generator for creating said pressure in response to a collision.

8. A safety belt arrangement as set forth in claim 7, wherein said elongated member is so designed to release force for inwardly shifting said segments for establishing engagement between the gear teeth of said segments and said gear member after completion of the pretensioning operation and to allow said segments to return to said initial position.

9. A safety belt arrangement as set forth in claim 1, wherein said segments are pivotally connected to each other at one end and said means comprises a spring normally biasing the free ends of said segments in a direction away from each other so as to maintain said gear teeth of said segments from the gear teeth of said gear member.

10. A safety belt arrangement as set forth in claim 9, wherein said pulley drive means includes a pressure generator, a thrusting piston responsive to said pressure to be driven in a direction corresponding to the retracting direction, and an elongated member for transmitting said driving force to said pulley.

11. A safety belt arrangement as set forth in claim 10, wherein said pulley drive means includes a gas generator for creating said pressure in response to a collision.

12. A safety belt arrangement as set forth in claim 11, wherein said elongated member is so designed to release force for inwardly shifting said segments for establishing engagement between the gear teeth of said segments and said gear member after completion of the pretensioning operation and to allow said segments to return to said initial position.

13. A safety belt arrangement as set forth in claim 1, wherein said means for maintaining said segments at said initial position comprises supporting pins which are provided a critical force smaller than the radial component of the rotational force exerted on said segments causing breakage for allowing radially inward movement of said segments to establish engagement of said gear teeth thereof to said gear teeth of said gear member.

14. A safety belt arrangement as set forth in claim 1, wherein said segments are pivotally connected to each other at one end and said means for maintaining said segments at said initial position comprises supporting pins supporting the other ends of said segments in a position spaced apart from said gear member in order to maintain said segments at said initial position, which support pins are provided a critical force smaller than the radial component of the rotational force exerted on said segments causing breakage for allowing radially inward movement of said segments to establish engagement of said gear teeth thereof to said gear teeth of said gear member.

* * * * *